United States Patent [19]

Kolesar

[11] Patent Number: 5,621,956
[45] Date of Patent: *Apr. 22, 1997

[54] DUCT FRAME ASSEMBLY APPARATUS

[75] Inventor: John R. Kolesar, West Mifflin, Pa.

[73] Assignee: Ward Industries, Inc., Pittsburgh, Pa.

[ * ] Notice: The term of this patent shall not extend beyond the expiration date of Pat. No. 5,448,815.

[21] Appl. No.: 379,799

[22] Filed: Jan. 27, 1995

Related U.S. Application Data

[63] Continuation-in-part of Ser. No. 179,412, Jan. 10, 1994, Pat. No. 5,448,815.

[51] Int. Cl.6 ........................................... B23P 11/00
[52] U.S. Cl. .................. 29/243.5; 29/252; 29/243.56; 29/281.5
[58] Field of Search .................. 29/525.1, 426.5, 29/243.5, 243.56, 252, 809, 464, 281.5, 818, 238, 251, 451, 525; 285/363, 368, 405, 412, 424

[56] References Cited

U.S. PATENT DOCUMENTS 3,712,650  1/1973  Mez .
4,508,376  4/1985  Arnoldt .
4,566,724  1/1986  Arnoldt et al. .
4,584,756  4/1986  Arnoldt .
5,054,823  10/1991  Arnoldt .
5,283,944  2/1994  Goodhue .

*Primary Examiner*—Robert C. Watson
*Attorney, Agent, or Firm*—Kirkpatrick & Lockhart LLP

[57] ABSTRACT

An apparatus for inserting the legs of an L-shaped corner member into corresponding channels of elongated flange members used in an assembly for connecting the adjacent ends of sheet metal ducts. The apparatus, in a preferred form, comprises a base member that is adapted to receive a first flange member in a receiving position. A first corner positioning member is attached to the base member and is adapted to position a leg of an L-shaped corner member in confronting relationship with the channel of a first flange member. First insertion apparatus is attached to the positioning member for selectively inserting the positioned leg into the channel of the first flange member a predetermined distance. A second corner positioning member is attached to the base member for orienting an end of a second flange member in confronting relationship with respect to the other leg of the L-shaped corner member. Second insertion apparatus is attached to the base member for forcing the second flange member onto the other leg of the L-shaped corner member a second predetermined distance.

15 Claims, 13 Drawing Sheets

5,621,956

DUCT FRAME ASSEMBLY APPARATUS

This is a continuation in-part application of U.S. patent application Ser. No. 08/179,412, Filed Jan. 10, 1994, now U.S. Pat. No. 5,448,815.

BACKGROUND OF THE INVENTION

1. Field of the Invention

The present invention relates to ductwork assembly apparatuses and, more particularly, is directed to apparatus for assembling L-shaped corner members and elongated flange members into a frame assembly for connecting the adjacent ends of sheet metal ducts.

2. Description of the Invention Background

In the heating, ventilation and air conditioning industry, ducts fabricated from various types of sheet metal materials are typically used to transport conditioned air throughout homes, factories, office buildings and other structures. One could surmise that perhaps there are collectively thousands of miles of such ducts in homes and various other structures throughout the world.

Typical heating, ventilation, and air conditioning duct arrangements comprise rectangular shaped elongated sections that are fastened together at their ends to form a single duct assembly. It has been found that such "sectional" duct assembly is more structurally sound than a single non-sectional duct of similar length. In such sectional duct assemblies, the duct sections must be perfectly aligned to prevent the duct assembly from buckling and to enable airtight seals to be established and maintained between each duct section.

Over the years, a variety of different "flange-type" joint assembly arrangements have been developed for connecting the adjacent ends of rectangular or square sheet metal ducts together. For example, U.S. Pat. No. 3,712,650 to Mez, U.S. Pat. No. 4,288,115 to Sullivan, and U.S. Pat. No. 5,054,823 to Arnoldt disclose various flange-type duct connection arrangements for interconnecting the adjacent ends of rectangular duct sections. Such flange-type connection arrangements typically consist of a pair of rectangular frames that are each constructed from four roll-formed flange members that are adapted to be attached to the edges of adjacent duct ends. The flange members typically comprise an L-shaped member that has an upstanding leg-receiving portion and a duct receiving portion extending perpendicularly therefrom. Four L-shaped corner members, each having relatively planar legs that are adapted to be inserted into the upstanding leg-receiving channels of adjacent flanges, are used to interconnect the flanges to form a rectangular shaped frame. The flanges are precut to predetermined lengths such that when assembled together into a rectangular shaped frame, the frame fits on the end of a corresponding duct for attachment thereto.

During the duct assembly process, the attachment frames are first assembled. Thereafter, each frame is inserted onto an end of a corresponding duct such that the end of the duct is forcibly received in the duct receiving portions of the flange members comprising the rectangular frame. After the frame has been inserted onto the corresponding duct end, it is typically secured to the duct by sheet metal screws, rivets, or spot welds.

After the frames have been attached to the adjacent ends of two duct sections, a gasket material is typically positioned between the frames. The frames are then bolted together in confronting relationship by bolts that extend through the L-shaped corner members. The heating, ventilation, and air conditioning industry has found that such flange-type connection arrangement serves to rigidly interconnect the adjacent ends of ducts together while maintaining a substantially airtight seal between the duct sections.

To ensure that the frame remains together after it has been assembled, the legs of the L-shaped corner members are complementarily dimensioned with respect to the leg-receiving channels of the flange members such that a force or friction type fit is created between the leg and the corresponding flange member. Such force fit arrangement, however, makes assembling the frames difficult and time consuming.

In the past, the frames have been manually assembled. Such assembly operation typically involves grasping a flange member in one hand and inserting the end of a corner leg into the leg-receiving channel of the flange member. The opposite end of the flange member is then abutted against a solid surface, usually the floor, and a rubber mallet or other suitable tool is used to drive the L-shaped corner member into the flange channel. A similar corner/flange assembly is then constructed in the same manner. Thereafter, the ends of the free legs of the four corner members are inserted into the side flange members and the corner members are struck with a hammer to cause the free legs to be inserted into the corresponding channels.

The reader will appreciate that the above-described method of connecting the L-shaped corner members to their corresponding flange members is fraught with many disadvantages. In particular, such an unstable method of supporting the flange member and corner assembly while it is being driven together provides an opportunity for the corner member to become dislodged from the flange member during the assembly process which could injure the individual assembling the flange/corner assembly. Also, if the flange member is not adequately supported, it, too, could strike the person constructing the assembly. It will also be appreciated that longer lengths of flange members are much more difficult to support during the assembly process. The reader will further appreciate that such manual assembly operation can damage the flange members and/or corner members as they are being driven together.

Thus, there is a need for apparatus for inserting the legs of L-shaped corner members into the channel of a corresponding flange member in a safe and efficient manner. There is a further need for an assembly apparatus that is capable of assembling corner members and flange members of different sizes and lengths. There is still another need for apparatus for assembling L-shaped corner members and precut flange members into a complete frame assembly for attachment to a correspondingly sized duct.

SUMMARY OF THE INVENTION

In accordance with a particular preferred form of the present invention, there is provided an apparatus for inserting the legs of an L-shaped corner member into the channels of corresponding flange members used in a frame assembly for connecting the adjacent ends of sheet metal ducts. In a preferred form, the apparatus comprises a base member that is adapted to support a first flange in a receiving position. A first positioning member is attached to the base member for positioning an L-shaped corner member in a first insertion position wherein a first leg of the L-shaped corner member is oriented in confronting relationship with a first end of the first flange member. Also attached to the base member is a first insertion member for inserting the positioned first leg of the L-shaped corner member into the channel of the first flange member a first predetermined distance. The apparatus also includes a second positioning member that is attached to the base member for positioning a first end of a second flange member in confronting relationship with a second leg of the L-shaped corner member. A second insertion member is attached to the base for causing the second leg of the L-shaped corner member to be inserted into the channel of the second flange member a second predetermined distance.

In another preferred embodiment, the assembly apparatus includes a base member for supporting a first flange member in a first assembly position. A first positioning member is attached to the base member for positioning a first leg of a first L-shaped corner member in a first insertion position wherein the first leg thereof is in confronting relationship with one end of a channel extending through the first flange member. A second positioning member is attached to the base member for positioning a primary L-shaped corner member in a primary insertion position wherein the primary leg thereof is in confronting relationship with the other end of the channel extending through the first flange member. A first insertion member is attached to the base member for inserting the first leg of the first L-shaped corner member into the end of the channel extending through the first flange member a first predetermined distance. A second insertion member is attached to the base member for inserting the primary leg of the primary L-shaped corner member into the other end of the channel extending through the first flange member a primary predetermined distance. A third positioning member is attached to the base member for positioning an end of a second flange member in a second insertion position on the base member such that a channel extending through the second flange member is in confronting relationship with a second leg of the first L-shaped corner member. A fourth positioning member is attached to the base member for positioning an end of a third flange member in a secondary insertion position on the base member such that a channel extending through the third flange member is in confronting relationship with a secondary leg of the primary L-shaped corner member. The assembly apparatus further includes a third insertion member that is attached to the base member for causing the second leg of the first L-shaped corner member to be inserted into the channel of the second flange member a second predetermined distance and the secondary leg of the primary L-shaped corner member to be inserted into the channel of the third flange member a secondary predetermined distance.

It is an object of the present invention to provide apparatus for the safe and efficient assembly of L-shaped corner members and corresponding flange members used in assemblies for connecting the adjacent ends of sheet metal ducts.

It is a further object of the present invention to provide apparatus that can simultaneously connect an L-shaped corner member to each end of an elongated flange member.

It is a further object of the present invention to connect L-shaped corner members of various sizes to corresponding flange members of varying lengths.

It is yet another object of the present invention to provide an apparatus for safely and efficiently assembling complete duct frame assemblies.

It will be appreciated that the present invention provides solutions to the aforementioned problems of inserting a leg of an L-shaped corner member into the channel of a flange member. The present invention serves to safely support a flange member in a receiving position while a leg of a corresponding corner member is inserted into the flange channel. The present invention can also be used to simultaneously insert the legs of corner members into the ends of the channel that extends through a corresponding flange member. The present invention can also be used to assemble four precut flange members and corner members into square or rectangular frames for connecting the adjacent ends of ducts together. The reader will appreciate that these and other details, objects and advantages will become apparent as the following detailed description of a present preferred embodiment proceeds.

BRIEF DESCRIPTION OF THE DRAWINGS

In the accompanying drawings, there is shown present preferred embodiments of the invention wherein like reference numerals are employed to designate like parts and wherein.

DETAILED DESCRIPTION OF THE PREFERRED EMBODIMENTS

Figure 1:
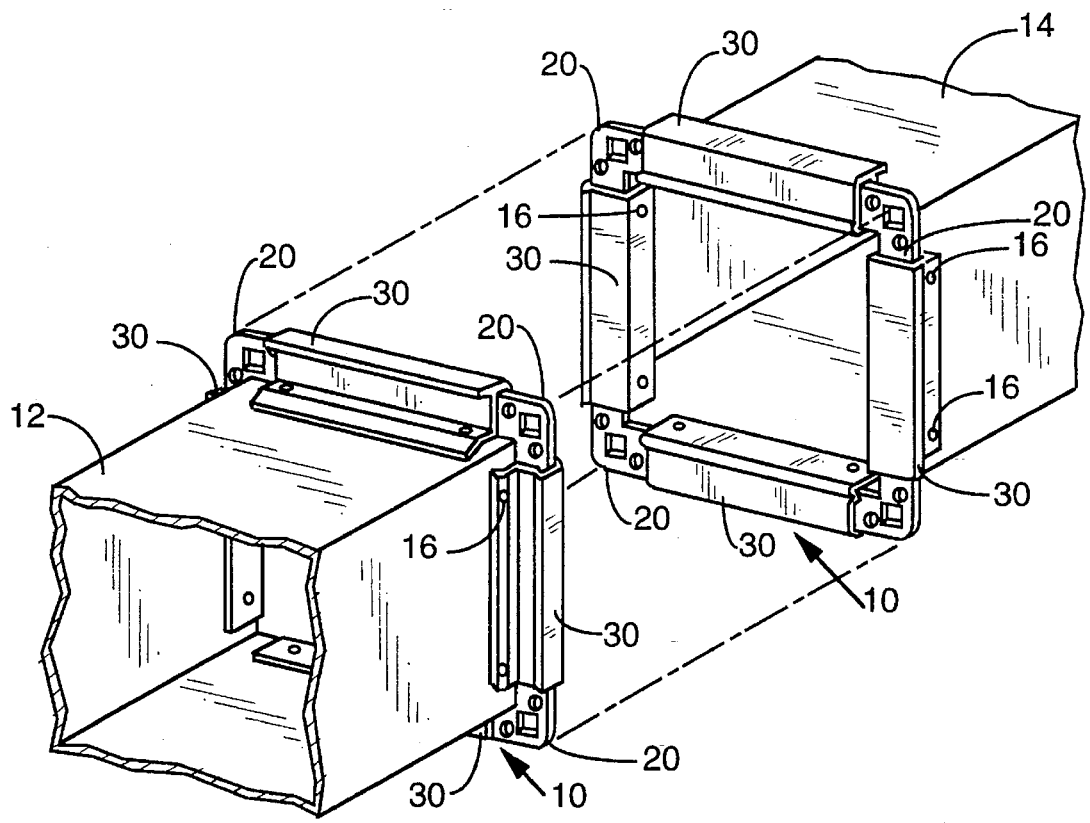
FIG. 1 is a perspective exploded assembly view of a typical duct flange assembly arrangement for connecting the adjacent ends of rectangular sheet metal ducts together.

Referring now to the drawings for the purposes of illustrating present preferred embodiments of the invention only and not for purposes of limiting the same, FIG. 1 depicts two rectangular duct frame assemblies 10 attached to the adjacent ends of two rectangular ducts (12, 14). As can be seen from FIG. 1, the rectangular frame assemblies 10 each comprise four L-shaped corner members 20 that are inserted into four flange members 30.

Figure 3:
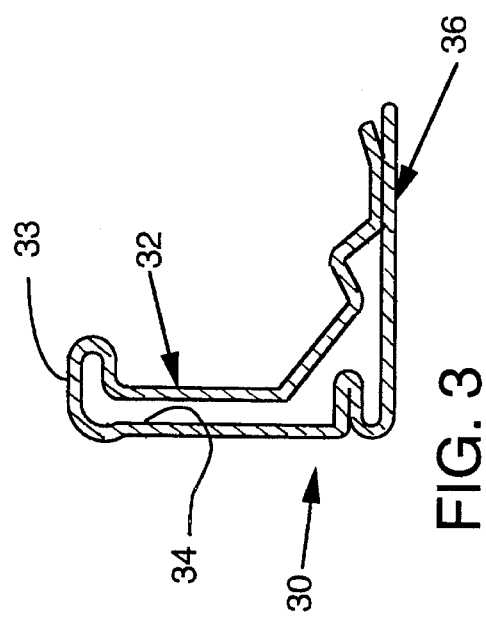
FIG. 3 is an end view of a typical flange member.

As will be discussed in further detail below, each flange member 30 is relatively L-shaped when viewed from the end and has an upstanding leg-receiving portion 32 and a duct receiving portion 36. See FIG. 3. The upstanding leg-receiving portion 32 has an end portion 33 and a leg receiving channel 34 that extends through the entire length of the upstanding leg-receiving portion 32. As can be seen in FIG. 1, after the L-shaped corner members 20 and flange members 30 are assembled into rectangular frame assemblies 10, the duct receiving portions 36 of the flanges 30 are inserted onto the ends of the adjacent ducts 12 and 14 such that the upstanding portions 32 of each flange on duct 12 are in confronting relationship with each of the upstanding portions 32 of the flanges 30 attached to duct 14. Screws 16 are then used to attached the flanges 30 to the ducts (12, 14). However, a variety of other known fastening means such as rivets or welds may be used to attach the flanges 30 to the ducts (12, 14).

After the frame assemblies 10 have been attached to the ends of the ducts (12, 14) in the manner depicted in FIG. 1, a gasket material (not shown) is typically placed between the flange assemblies 10. The frame assemblies 10 are then fastened together by bolts (not shown) that extend through bolt holes 28 (see FIG. 2) that are provided in the L-shaped corner members 20.

Figure 2:
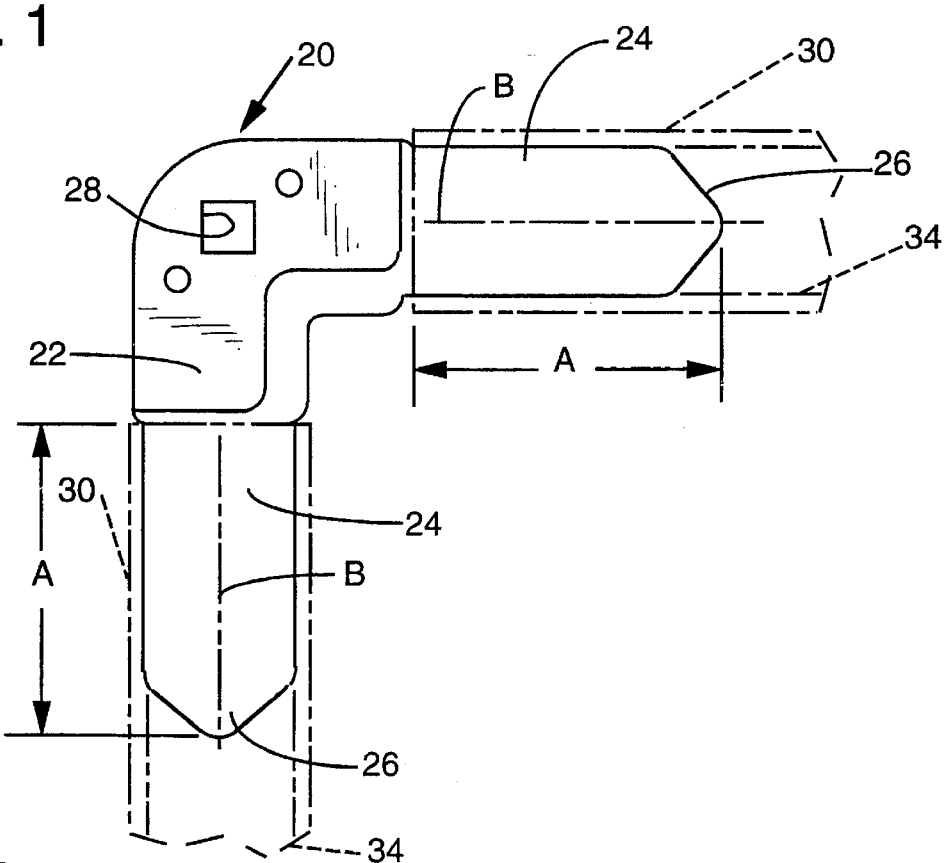
FIG. 2 is a plan view of a typical L-shaped corner member with the legs thereof inserted into the channels of corresponding flange members that are shown in phantom lines.

FIG. 2 depicts a typical L-shaped corner member 20 that has a corner portion 22 and two outwardly extending leg portions (24, 25). Each leg portion (24, 25) is substantially planar and terminates in a slightly pointed end portion 26 that aides in the insertion of the legs (24, 25) into a corresponding channel 34 of a flange member 30. Leg portions (24, 25) are complementarily dimensioned with respect to the channel 34 of a flange member 30 such that the legs (24, 25) can be inserted into a corresponding channel 34 a predetermined distance "A" (in a preferred embodiment, distance "A" is approximately 2.125") and retained therein by frictional engagement between the flange member 30 and the leg member (24, 25). The reader will appreciate that distance "A" will vary depending upon the exact size and construction of the L-shaped corner members 20 and the flange members 30. Also, for explanatory purposes, it will be appreciated that each leg (24, 25) has an insertion axis designated as "B" and the channel 34 of each flange member 30 similarly has an insertion axis designated as "C" such that when axes "B" and "C" are substantially vertically and horizontally aligned (i.e., substantially coaxial), the leg (24, 25) can be inserted into the channel 34.

The foregoing discussion of the corner member 20 and flange member 30 construction and assembly was provided to give the reader an understanding of the assembly of a typical duct flange connection arrangement for connecting the adjacent ends of two rectangular or square ducts. The corner members and flanges discussed and depicted herein are exemplary of the type of connectors and flanges typically used in the heating, ventilation, and air conditioning industry. However the specific size, shape, and construction of the corner members and flange members should not be construed to limit the scope of the duct flange assembly apparatus of the subject invention.

Figure 4:
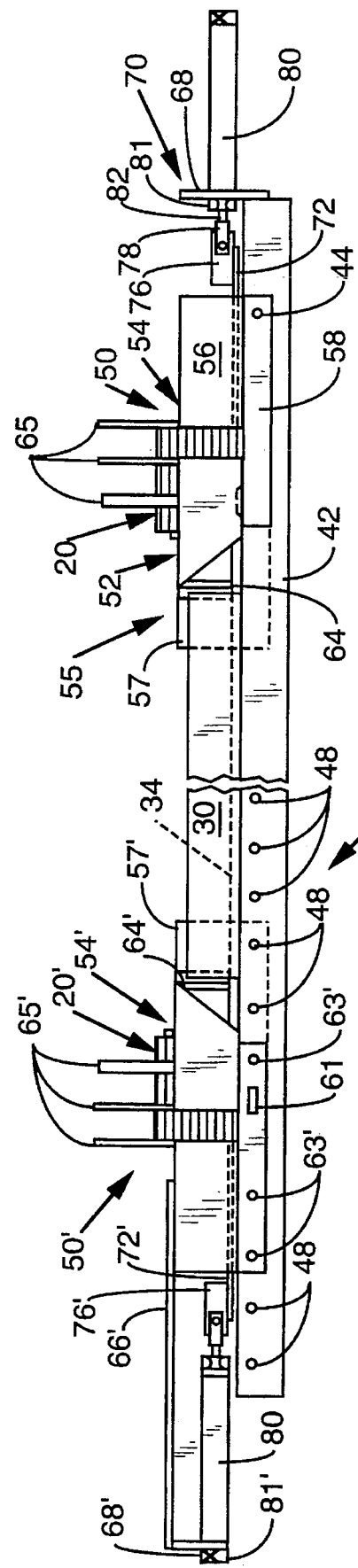
FIG. 4 is a side elevational view of the duct flange assembly apparatus of the present invention.
Figure 5:
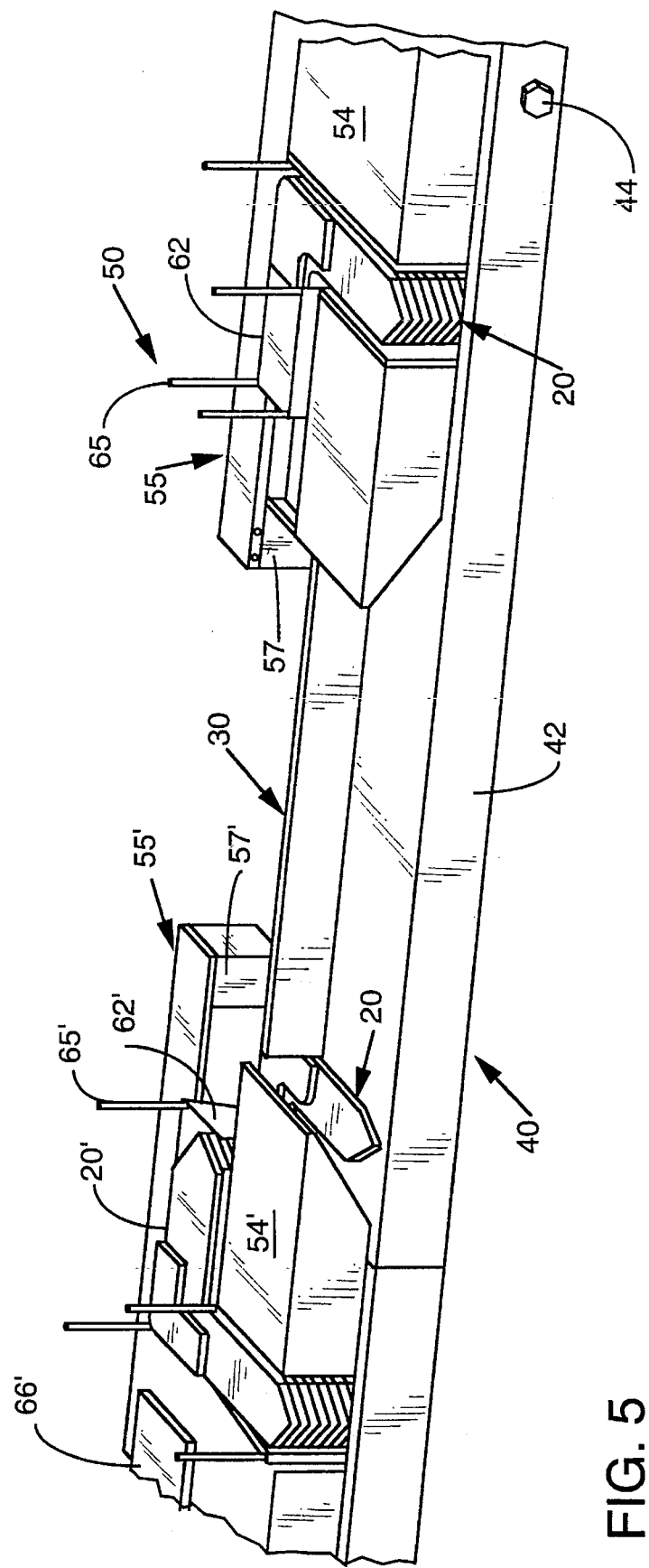
FIG. 5 is a partial perspective view of the duct flange assembly apparatus of the present invention.

FIGS. 4 and 5 depict a present preferred duct flange assembly apparatus, generally designated as 40, for connecting a corner member to each end of a flange member. A preferred assembly apparatus 40 comprises a base member 42 and a right corner positioning unit 50 and a left corner positioning unit 50' that are received on the base member 42. Base member 42 is preferably fabricated from 6" steel C-channel; however, the skilled artisan will readily appreciate that the base member 42 can be fabricated from a variety of other materials without departing from the spirit and scope of the present invention. Also, as will become evident as the detailed description proceeds, base member 42 may be provided in a variety of different lengths and widths depending upon the lengths and widths of flange members 30 to be assembled.

Figure 6:
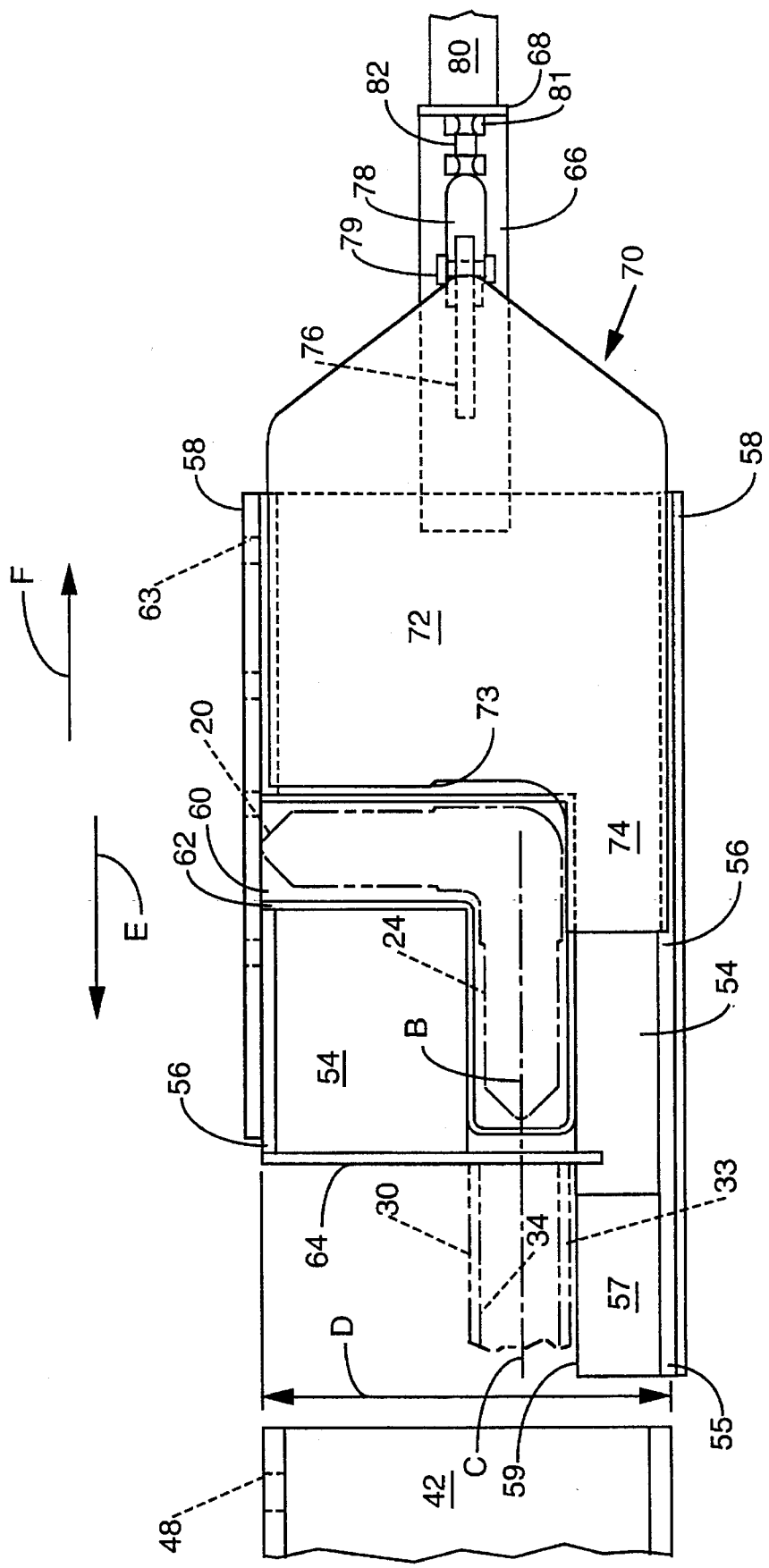
FIG. 6 is a bottom assembly view of a right corner positioning unit of the present invention removed from the base member, the bottom of which is also partially shown.

As can be seen in FIGS. 4–6, the right corner positioning unit 50 comprises a housing member 52 that is preferably fabricated from steel plate and channel members that are welded together. In particular, housing member 52 comprises a top channel member 54 that has two downwardly extending side portions 56. Attached to each side portion 56, preferably by welding, is a retaining plate 58. Retaining plates 58 are preferably adapted to slidably retain the right corner positioning assembly 50 on the base member 42. Therefore, the distance "D" (see FIG. 6) between the retaining plates 58 is slightly larger (i.e., 0.125") than the width of the base member 42.

In a preferred embodiment, a right corner-receiving cavity 60 is provided through the top channel 54. Cavity 60 is sized and shaped to freely receive a plurality of L-shaped corner members 20. In a preferred embodiment, cavity 60 is provided with a liner 62 that is fabricated from a piece of steel plate having an L-shape. The liner 62 is preferably welded to top channel 54 such that the corner members received therein are positioned for insertion into the channel 34 of a frame member 30 that has been placed in a receiving position on the base member 42. Also in a preferred embodiment, a downwardly extending end plate 64 is attached to the top channel 54, preferably by welding, in the position shown in FIG. 6.

As can also be seen in FIGS. 5 and 6, a portion 55 of the top channel 54 extends beyond end plate 64 and an orientation member 57, preferably consisting of a piece of steel bar, is welded thereto. The orientation member 57 serves to provide a surface 59 for orienting the flange member 30 in a receiving position on the base member 42 with respect to the corner members 20 positioned in the liner 62. From reference to FIG. 6, the skilled artisan will appreciate that when the end 33 of the upstanding leg portion 32 of a flange member 30 is abutted against bearing surface 59, the insertion axis "C" of the channel 34 will be horizontally aligned with the insertion axis "B" of the leg 24 of a corner member 20 received in the liner 62.

The legs 24 of corner members 20 are inserted into a channel 34 of a corresponding flange 30 by an insertion assembly generally designated as 70. More particularly and with reference to FIG. 6, insertion assembly 70 preferably comprises a driver plate 72 that is dimensioned to freely slide between restraining plates 58 in the directions depicted by arrows "E" and "F". Preferably, the front portion of the driver plate 72 is provided with an L-shaped portion 74 that is sized and shaped to receive an L-shaped corner member 20. In a preferred embodiment, driver plate 72 is provided with an offset area 73 to receive the offset corner portion of a corner member 20. It will be appreciated that L-shaped portion 74 in cooperation with offset area 73 serves to keep the insertion axis "B" of leg 24 substantially horizontally aligned with the insertion axis "C" of the corresponding flange member 30 as driver plate 72 drives leg 24 into the channel 34 in the insertion direction depicted by arrow "E". Preferably, the rear end of the driver plate 72 has an attachment plate 76 welded thereto that is adapted to receive a commercially available clevis member 78. In particular, clevis member 78 is pinned to attachment plate 76 by a pin 79 in a known manner. The opposite end of clevis 78 is attached, in a known manner, to the extendable and retractable piston 82 of a cylinder 80, the operation of which will be discussed in further detail below. As can be seen in FIG. 4, a cylinder attachment plate 68 is attached to the base member 42, by bolting or welding and is attached to the front of the cylinder 80 in a known manner (i.e., by a fastening nut arrangement 81 provided on the front portion of the cylinder 80) such that the cylinder 80 is rigidly supported from the base member 42. It will be appreciated that attachment plate may also be attached to the rear of cylinder 80 by other known cylinder attachment means such as by removable pins, etc. As can also be seen in FIGS. 4 and 5, extension plates 65 may be attached to the top channel member 54 to increase the corner holding capacity of the liner 62.

In a preferred embodiment, right corner positioning unit 50 is rigidly attached to the base member 42 by a bolt 44 that extends through bores 63 provided in one of the restraining members 58 and bores 48 provided in the sides of the base 42. The skilled artisan will appreciate, however, that the right corner positioning unit 50 can be attached to the base member by a variety of other known fastening arrangements.

Figure 7:
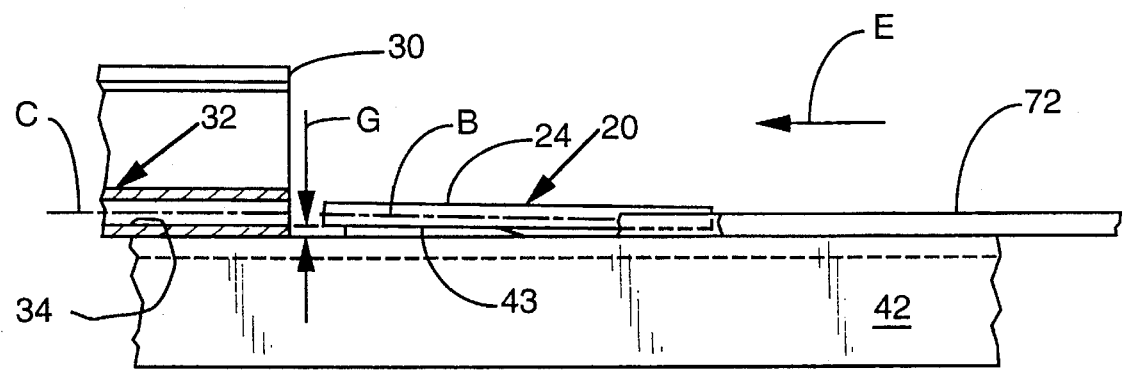
FIG. 7 is a partial side elevational view of the base member and the drive plate of a right corner positioning unit that illustrates the registration and insertion of a leg of a right corner member into the channel of a flange member shown in partial cross-section.

Also in a preferred embodiment, a right registration member 43 is attached to the base member 42 to raise the leg 24 of the L-shaped corner member 20 that is being inserted into the channel 34 of a flange member 30 a predetermined distance "G" above the base member 42 such that the insertion axis "B" of the corner member leg 24 is substantially vertically aligned with the insertion axis "C" of the channel 34. See FIG. 7. Preferably, registration member 43 has a tapered profile such that it can engage the front end 26 of the corresponding leg 24 and cause the leg 24 to be raised above the base a distance "G" to thereby vertically align the insertion axis "B" of the corresponding leg 24 with the insertion axis "C" of the channel 34 so that the leg 24 may be inserted into channel 34 by the driver plate 72. In a preferred embodiment, the registration member 43 is fabricated from a piece of tapered steel that is welded to the base member 42. Silicon spray or other lubricant may be used to reduce the friction between the leg 24 and the registration member 43. The skilled artisan will also appreciate that registration member 43 may be fabricated from self-lubricating material such as graphite impregnated steel to reduce the amount of friction between the registration member 43 and the leg 24.

In addition to the right corner positioning unit 50, a "left" corner positioning unit 50' for positioning and inserting a leg 24' of a second corner member 20' into the channel 34 at the left end of the flange member 30 may also be provided on the base member 42. From reference to FIGS. 4, 5, and 8, the skilled artisan will appreciate that, except for differences discussed below, the left corner positioning unit 50' is a "left-handed" version of the right corner positioning unit 50 and is constructed from substantially the same elements (designated by "'" in FIGS. 4, 5, 8, and 9) in substantially the same manner as the right corner positioning unit 50.

In a preferred embodiment, however, the left corner positioning unit 50' is adapted to be easily movably positioned on the base member 42 to increase or decrease the distance between the positioning units 50 and 50' to enable varying lengths of flange members to be positioned in receiving positions on the base member 42. To enable the left corner positioning unit 50' to be easily repositioned on the base member 42, a plurality of bores 63' are provided in the retaining plate 58' that are adapted to align with one of a plurality of spaced bores 48 provided in the sides of the base 42. Thus, a flange member 30 is first placed on the base in a receiving position. Thereafter, the left corner positioning member 50' is slidably positioned on the base member 42 to a point where the end plate 64' of the left corner positioning unit 50' nearly abuts the left end of the flange member 30 and a bore 63' in the retaining plate 58' aligns with a bore 48 in the base member 42. To retain the left corner positioning unit 50' in that position, a commercially available quick-release pin 61' is inserted into the aligned bores 48 and 63'. The skilled artisan will appreciate, however, that the left corner positioning unit 50' may be releasably locked in position by a number of other known "quick release" fastening arrangements without departing from the spirit and scope of the present invention. It will also be appreciated that the right corner positioning unit 50 may, in the alternative, be pinned to the base 42 in a similar manner. Yet another alternative construction may comprise both of the positioning units 50 and 50' being pinned to the base member 42.

As can also be seen in FIG. 4, cylinder 80' is attached to the left corner positioning unit 50' so that it can travel therewith. In a preferred embodiment, an attachment plate 66' is attached to the top channel 54, preferably by welding and extends to a position above the rear portion of cylinder 80'. A second attachment plate 68' is attached to plate 66' and is connected to the rear of cylinder 80' by known fastening means such as a securing nut 81' or a pin (not shown).

Figure 8:
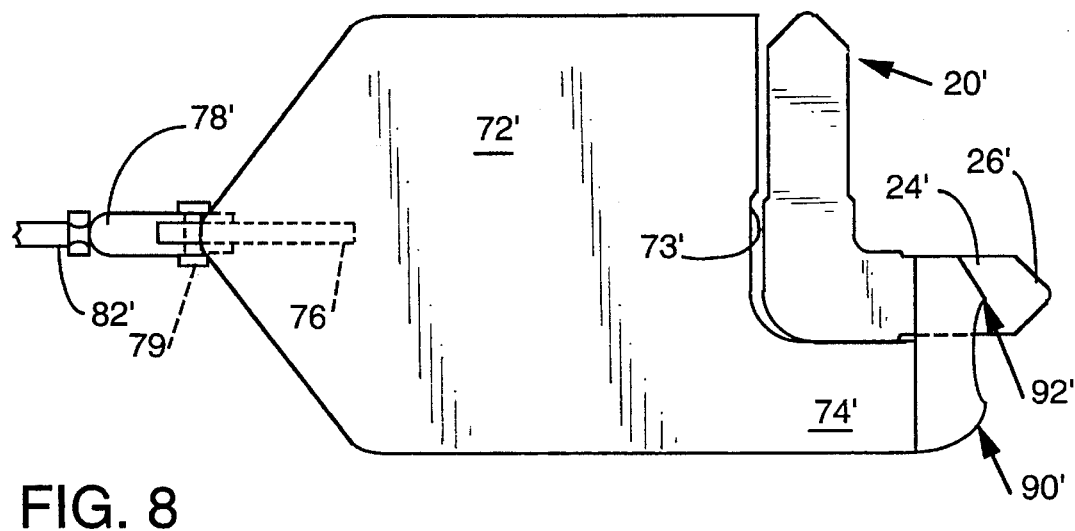
FIG. 8 is a bottom view of the drive plate of a left corner positioning unit and a left L-shaped corner member.
Figure 9:
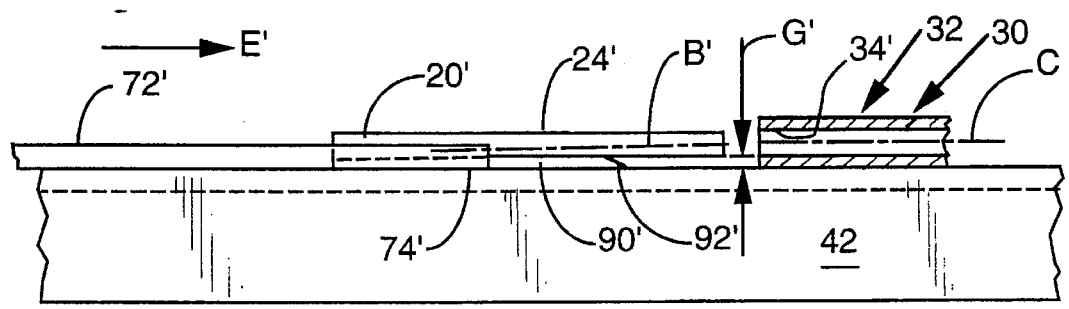
FIG. 9 is a partial side elevational view of the base member and the drive plate of a left corner positioning unit that illustrates the registration and insertion of a leg of a left corner member into the channel of a flange member shown in partial cross-section.

Referring now to FIGS. 8 and 9, it can be seen that a movable registration member 90' is attached to the front end 74' of the driver plate 72'. Preferably, movable registration member 90' has a tapered front portion 92' and is shaped as illustrated in FIGS. 8 and 9. Those of ordinary skill in the art will appreciate, however, that the movable registration member 90' may be provided in a variety of other shapes and sizes. As can be seen in FIG. 9, movable registration member 90' serves to raise the end 26' of the leg 24' of a corresponding corner member 20' a predetermined distance "G"' above the base member 42 such that the insertion axis "B"' is substantially vertically aligned with the insertion axis "C" of the channel 34 extending through the flange member 30. It will be appreciated that the tapered front edge 92' of the movable registration member 90' serves to slide under the left end of the flange member as the leg 24' of the corner member 20' is inserted into the channel 34.

Figure 10:
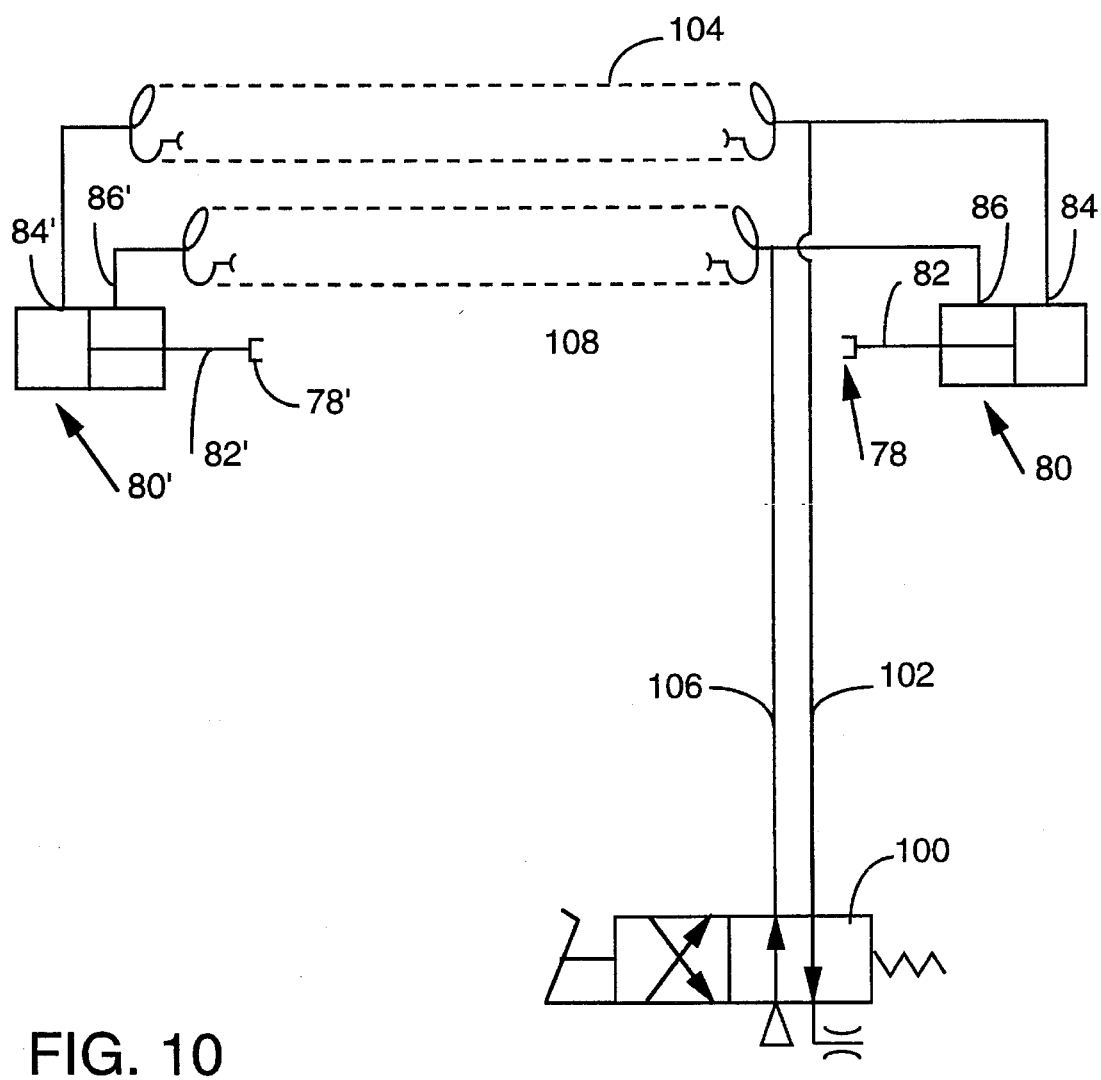
FIG. 10 is a schematic view of a preferred air system for controlling the air cylinders of the present invention.

The operation of cylinders (80, 80') can be understood from reference to FIG. 10. In a preferred embodiment, cylinders (80, 80') are pneumatically powered. However, the skilled artisan will readily appreciate that cylinders (80, 80') may also be hydraulically powered. It will be further appreciated that driver plates (72, 72') can be actuated by a variety of other known actuation means such as motor driven cam arrangements, rack and pinion gear arrangements, etc., without departing from the spirit and scope of the subject invention. As can be seen from FIG. 10, a four-way valve 100 that is attached to a source of compressed air (not shown) is used to control the actuation of cylinders (80, 80'). In a preferred embodiment, valve 100 comprises a four-way foot-actuated valve that is manufactured by Norgren Industries under the model No. K71DA00-K56-KFO; however, a myriad of other valves may be used. An air line 102 is attached to port 84 on cylinder 80 for supplying insertion air thereto. Air line 102 also supplies insertion air to cylinder 80' by means of a flexible air line section 104 that is connected to air line 102 and port 84' of air cylinder 80'. Similarly, retraction air is supplied to cylinder 80 by an air line 106 that supplies air from valve 100 to port 86 on cylinder 80. Air line 106 also supplies retraction air to cylinder 80' by a flexible air line 108 that is attached to air line 106 and port 86' on cylinder 80. It will be understood that such arrangement permits the simultaneous actuation of cylinders (80, 80'). After the legs (24, 24') of the corner members (20, 20') have been inserted into the channel 34, valve 100 causes retraction air to be supplied to cylinders (80, 80') thereby causing pistons (82, 82') to be simultaneously retracted. The skilled artisan will appreciate that the above-described air system represents one of many ways in which cylinders (80, 80') may be controlled. In particular, cylinders (80, 80') may be controlled by discrete air systems such that they do not operate simultaneously.

In a preferred embodiment, cylinders (80, 80') each have adjustable strokes so that the distance that the legs (24, 24') are inserted into the channel 34 may be varied. While cylinders having a 5" adjustable stroke have been found to work well in this application, cylinders having other adjustable and non-adjustable strokes may also be used.

The operation of the flange assembly apparatus 40 of the present invention can be best understood from reference to FIGS. 5 and 6. Before the assembly process is started, a plurality of right corners 20 and a plurality of left corners 20' are placed in their respective corner receiving cavities (60, 60') in the positioning units (50, 50'), respectively. A flange member 30 is placed on the base 42 member in a receiving position wherein its upstanding leg-receiving portion 32 is received on the base member 42. The right end of the flange member 30 is abutted against end plate 64. Thereafter, the removable pin 61 is removed from bores 63' and 48 and the left corner positioning unit 50' is slidably moved in a direction toward the right corner positioning unit 50 until the left end of the flange member 30 abuts or nearly abuts end plate 64' and a bore 63' aligns with a bore 48 in the base member 42. The pin 61 is then inserted through the aligned bores 63' and 48 to retain the left corner positioning unit 50' in position.

The end 33 of the upstanding leg-receiving portion 32 of the flange member 30 is then abutted against orientation surfaces (59, 59') and held in that "receiving" position while valve 100 is actuated by the operator's foot. It will be appreciated that prior to actuation, driver plates (72, 72') are in a retracted position wherein a corner member (20, 20') may be received in a ready position as shown in FIGS. 6 and 8. When valve 100 is actuated, pistons (82, 82') are extended to thus cause the driver plates (72, 72') to move in the directions depicted by arrows ("E", "E'") respectively, thereby causing the legs (24, 24') to be inserted into the corresponding ends of channel 34. Thereafter, in the manner described above, valve 100 causes the pistons (82, 82') to be retracted, thus moving the driver plates (72, 72') in the ("F", "F'") directions, respectively, to their original starting positions wherein the next consecutive corners (20, 20') are permitted to drop under the force of gravity into their respective ready positions as shown in FIGS. 6 and 8.

Figure 11:
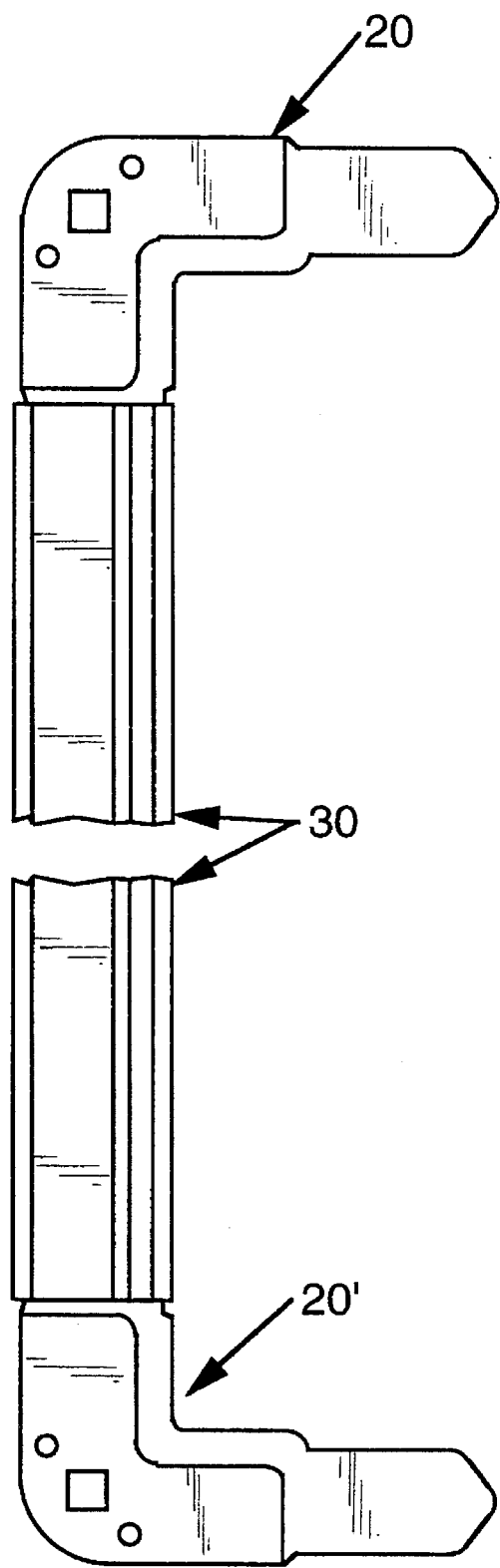
FIG. 11 is a plan view of a flange/corner assembly that has been assembled by a preferred embodiment of the present invention.
Figure 12:
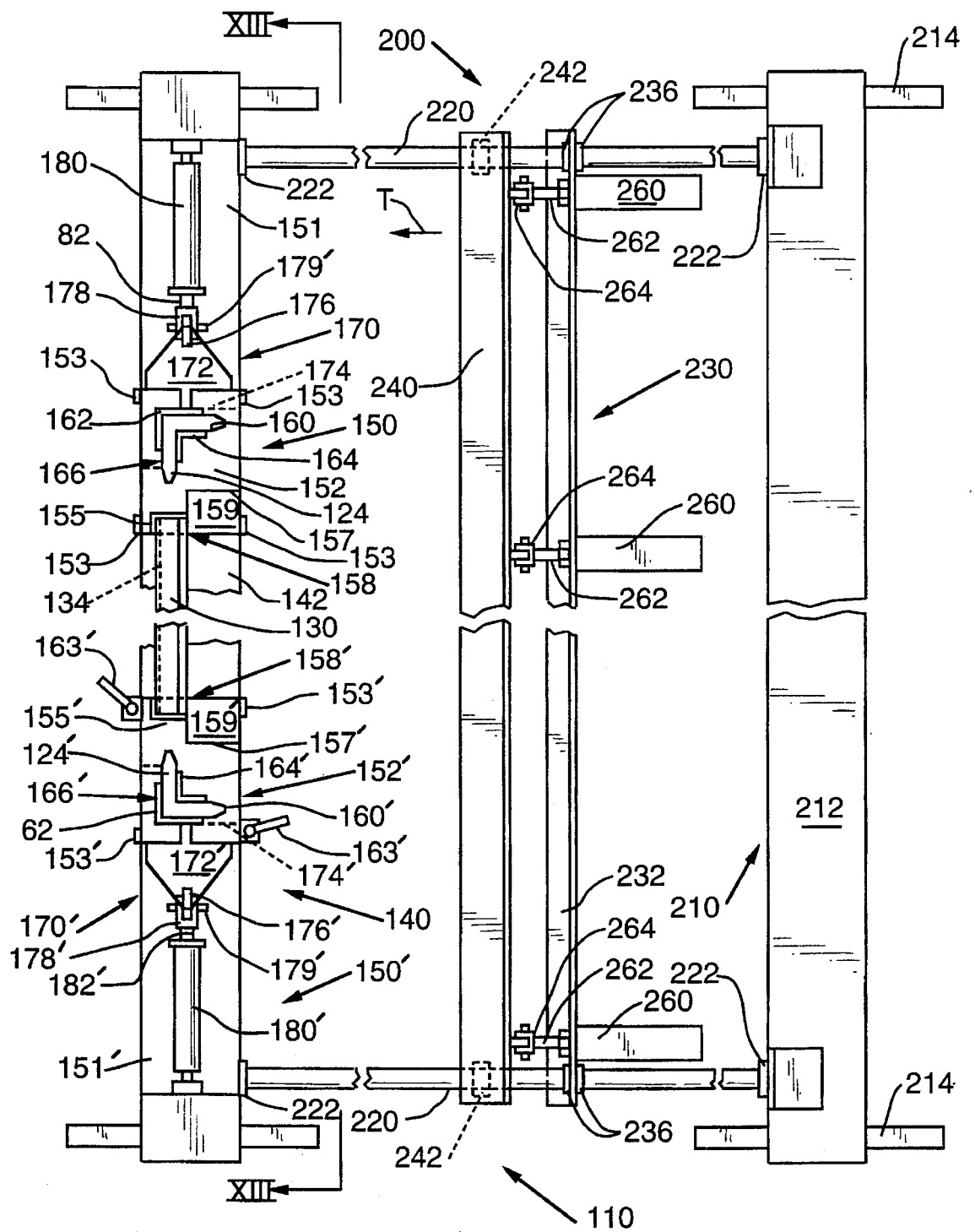
FIG. 12 is a plan view of another preferred duct frame assembly apparatus of the present invention with a first flange member supported thereon.
Figure 13:
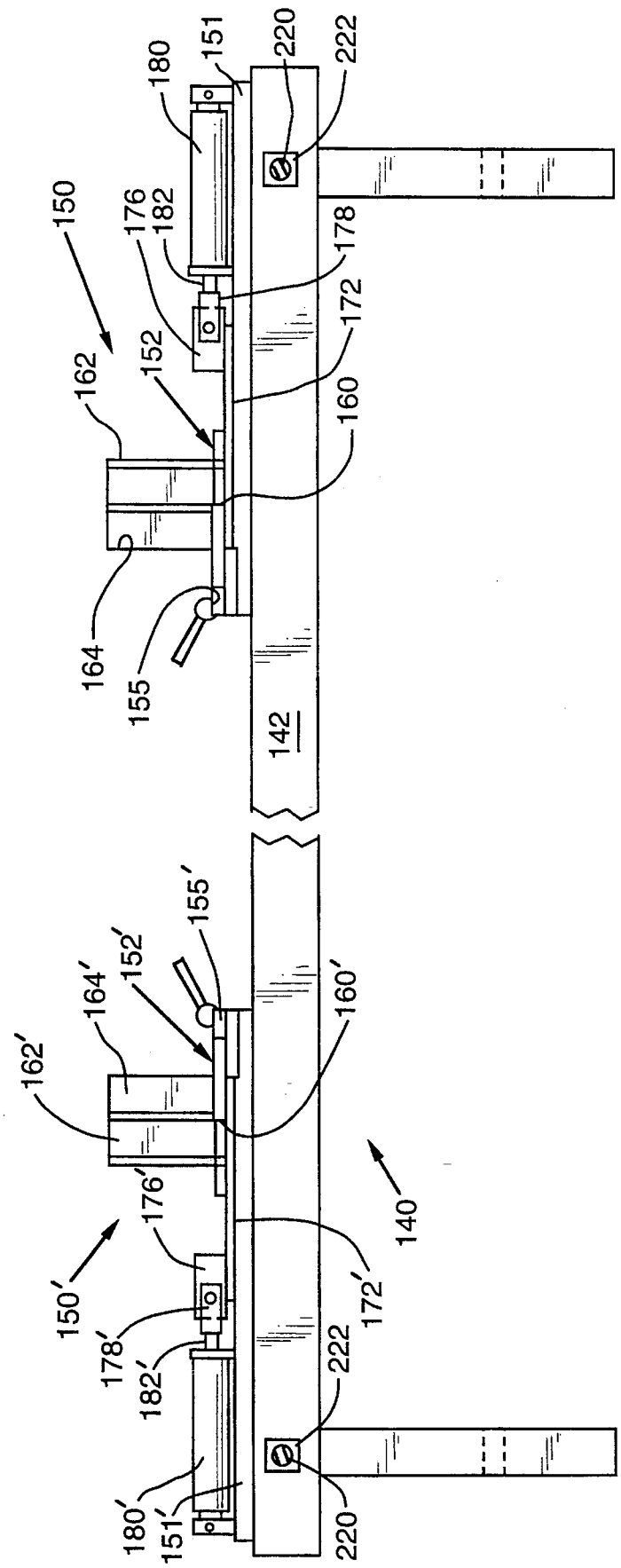
FIG. 13 is an elevational view of the duct frame assembly apparatus taken along line XIII—XIII in FIG. 12 with some of the elements thereof shown in cross-section for clarity.

The resulting flange/corner piece assembly, generally designated as 101, is depicted in FIG. 11. After the above-described assembly process is completed, the flange/corner assembly 101 is removed from the base 42 and another flange member 30 is placed in the receiving position and the entire process is repeated. After two flange/corner piece assemblies 101 have been assembled, they can then be connected to two side flange members 30 to complete a frame assembly 10.

Another preferred embodiment of the present invention is depicted in FIGS. 12–15. As can be seen in FIGS. 12–15, this embodiment of the present invention comprises a duct frame assembly apparatus 110 that includes a duct flange assembly apparatus 140, that is similar to the duct flange assembly apparatus 40. As will be evident from the disclosure to follow, the duct frame assembly apparatus 110 can be used to assemble an entire duct frame assembly 10.

In this embodiment, a preferred duct flange assembly apparatus 140 comprises a base member 142 and a right or "first" corner positioning unit 150 and a left or "primary" corner positioning unit 150' that are received on the base member 142. Base member 142 is preferably fabricated from 6" steel C-channel; however, the skilled artisan will readily appreciate that the base member 142 can be fabricated from a variety of other materials without departing from the spirit and scope of the present invention. Also, as will become evident as the detailed description proceeds, base member 142 may be provided in a variety of different lengths depending upon the lengths of flange members 30 to be assembled.

As can be seen in FIGS. 12–15, the first corner positioning unit 150 comprises a mounting plate 151 that is preferably welded to the base member 142. It will be appreciated, however, that mounting plate 151 may be attached to the base member 142 by a variety of other fasteners such as bolts, screws, etc. In addition, a "first" positioning member 152 is attached to the mounting plate 151 preferably by welded tabs 153 that support the first positioning member 152 above the mounting plate 151 to define an opening therebetween sized to slidably receive a driver plate 172, the purpose of which will be discussed below. In a preferred embodiment, a first corner-receiving cavity 160 is provided through the first positioning member 152. Cavity 160 is sized and shaped to freely receive a plurality of "first" L-shaped corner members 120. Angles 162 and 164 are preferably welded to the top surface of the first positioning member to create a magazine 166 for storing a plurality of corner members 120 therein.

As can be seen in FIGS. 12–15, the positioning member 152 is preferably provided with a notch 155 that is sized to orient an end of a "first" flange member 130 in a receiving position. In addition, positioning member 152 is preferably provided with a "second" notch 157 that, as will be discussed in further detail below, serves to align a second lateral flange member 131 in a "second" insertion position. The skilled artisan will appreciate that the corner members 120 received in magazine 166 are positioned in a "first" insertion position for insertion into the channel 134 of the frame member 130 that has been oriented in the receiving position on the base member 142. Preferably, a first recessed area 158 is provided in the mounting plate 151 that corresponds with the notch 155 in the positioning member 152. Similarly, a second recess area 159 is provided in the mounting plate 151 that corresponds with the notch 157 in the positioning member 152. It will be appreciated that the depths of the recesses (158, 159) correspond to the thicknesses of the materials comprising the flange members (130, 131), respectively. That is, when the end of the flange member 130 is oriented in the recess 158 by the notch 155 in the positioning member 152, the channel 134 of the flange member 130 will be aligned in confronting relationship with the "first" leg 124 of the L-shaped corner member 120 so that the leg 124 can be inserted therein. Likewise, when the end of the second flange member 131 is oriented in the recess 159 by the notch 157, the channel 133 of the flange 131 will be aligned in confronting relationship with the "second" leg 125 of the L-shaped corner member 120 such that the leg 125 can be inserted therein.

The corner members 120 are inserted into the channel 134 of a corresponding flange 130 by an insertion assembly generally designated as 170. In this embodiment, insertion assembly 170 preferably comprises a driver plate 172 that is dimensioned to freely slide between the base member 142 and the positioning member 152 in the manner discussed hereinabove. Preferably, the front portion of the driver plate 172 is provided with an L-shaped portion 174 that is sized and shaped to receive an L-shaped corner member 120. Driver plate 172 is also provided with an offset area that is sized and operates in the manner discussed hereinabove to further align the first leg 124 of the first L-shaped corner member 120 with the channel 134 of the first flange member 130. Preferably, the rear end of the driver plate 172 has an attachment plate 176 welded thereto that is adapted to receive a commercially available clevis member 178. In particular, clevis member 178 is pinned to attachment plate 176 by a pin 179 in a known manner. The opposite end of clevis 178 is attached, in a known manner, to the extendable and retractable piston 182 of a "first" cylinder 180 that is attached to the mounting plate 151.

The subject duct frame assembly apparatus 110 also includes a "primary" corner positioning unit 150' for positioning and inserting a "primary" leg 124' of a primary corner member 120' into the channel 134 at the other end of the first flange member 130. From reference to FIGS. 12-15, the skilled artisan will appreciate that, except for the differences discussed below, the primary corner positioning unit 150' is a "left-handed" version of the first corner positioning unit 150 and is constructed from substantially the same elements (designated by "'" in FIGS. 12-15) in substantially the same manner as the first corner positioning unit 150.

In a preferred embodiment, however, the primary corner positioning unit 150' is adapted to be easily movably positioned on the base member 142 to increase or decrease the distance between the positioning units 150 and 150' to enable varying lengths of flange members 130 to be positioned in receiving positions on the base member 142. To enable the primary corner positioning unit 150' to be easily repositioned on the base member 142, the tabs 153' that serve to attach the positioning member 152' to the mounting plate 151' are sized to slidably retain the mounting plate on the base member 142. To secure the unit 150' in a predetermined position, commercially available lock bolts 163' are used. The skilled artisan will appreciate that the lock bolts 163' are configured to clamp the unit 150 to the base member 142 and can be easily manually locked and unlocked. However, other methods of movably attaching the unit 150 to the base member 142, such as the methods discussed above, may also be successfully used.

Preferably, the duct frame assembly apparatus 110 further includes a lateral flange assembly apparatus generally designated as 200. As can be seen from FIGS. 12-15, the lateral flange assembly apparatus 200 preferably comprises a base assembly 210 that includes a channel 212 that is supported on leg assemblies 214. Base assembly 210 is preferably arranged as shown in FIGS. 12-15 such that it is substantially parallel to base member 142. In this embodiment, a pair of support rails 220 serve to interconnect the base member 142 to the base assembly 210. Rails 220 preferably comprise commercially available polished steel or chromed "positioning" rails that are typically used in positioning applications. The ends of each rail 220 are attached to the base member 142 and the channel member 212 by commercially available attachment flanges 222. However, other methods of fastening the rails 220 to members (142, 212) may also be used. Preferably, rails 220 are mounted such that they are substantially parallel and co-planar with each other.

Movably received on the rails 220 is a third insertion assembly, generally designated as 230. Insertion assembly 230 preferably comprises a cross member 232 and a support member 240. Cross member 232 is preferably fabricated from angle iron; however, other material may also be used. In this embodiment, commercially available split collars 236 that are capable of being slidably positioned on corresponding rail members 220 and selectively locked in position are attached to each end of the cross member 232 to movably support the cross member 232 on the rail members 220. The skilled artisan will appreciate that a variety of other known lockable collar or bearing arrangements may also be used to movably support the cross member 232 on the rails 220.

In this embodiment, the support member 240 is also preferably fabricated from angle iron. Commercially available linear bearing members 242 are attached to the bottom of the support member 240 for movably supporting the support member 240 on the rails 220. At least one, and preferably three, cylinders 260, each having extendable pistons 262, are attached to the cross-member 232 as shown in FIGS. 12-15. Cylinders 260 are preferably arranged as shown such that the free ends of their pistons 262 are attached to the support member 240 by clevis assemblies 264.

In a preferred embodiment, cylinders (180, 180', 260) are pneumatically powered. However, the skilled artisan will readily appreciate that cylinders (180, 180', 260) may also be hydraulically powered. It will be further appreciated that driver plates (172, 172') and support member 240 can be actuated by a variety of other known actuation means such as motor driven cam arrangements, rack and pinion gear arrangements, etc., without departing from the spirit and scope of the subject invention.

Cylinders (180, 180') are preferably controlled by the air system discussed above and depicted in FIG. 10. Cylinders 260 are also preferably air operated and are adapted to be simultaneously extended and retracted by a single valve (not shown) that can be controlled by a manually operated switch or foot pedal (not shown). The skilled artisan will appreciate that cylinders (180, 180', 260) may be controlled in a variety of other manners.

The operation of the present duct frame assembly apparatus 110 can be best understood from reference to FIGS. 12-15. Before the assembly process is started, a plurality of first corners 120 and a plurality of primary corners 120' are placed in their respective magazines (166, 166') in the positioning units (150, 150'), respectively. A first flange member 130 is placed on the base 142 member such that it is received in the first recess 158 in the mounting plate 151 and the notch 155 in the positioning member 152. Thereafter, the lock bolts 163' are loosened to permit the unit 150' to be slidably positioned on the base member 142. The unit 150' is positioned such that the other end of the first channel member 130 is received in the second recess portion 158' and second notch 155' to thereby position that end of the first flange member 130 in a receiving position. The lock bolts 163' are then secured to retain the unit 150' in position. See FIG. 12.

The flange member 130 is then manually retained in that receiving position by the operator while cylinders (180, 180') are actuated. It will be appreciated that prior to actuation of cylinders (180, 180'), driver plates (172, 172') are in a retracted position wherein corner members (120, 120') are received in ready positions as was discussed above. When cylinders (180, 180') are actuated, pistons (182, 182') are extended to thus cause the driver plates (172, 172') to simultaneously insert the first leg 24 of the first corner member 120 and the primary leg 124' of the primary corner member 120' into corresponding ends of channel 134 in the first flange member 130. Thereafter, in the manner described above, pistons (182, 182') are automatically retracted, thus moving the driver plates (172, 172') to their original starting positions wherein the next consecutive corners (120, 120') are permitted to drop under the force of gravity into their respective ready positions.

Figure 14:
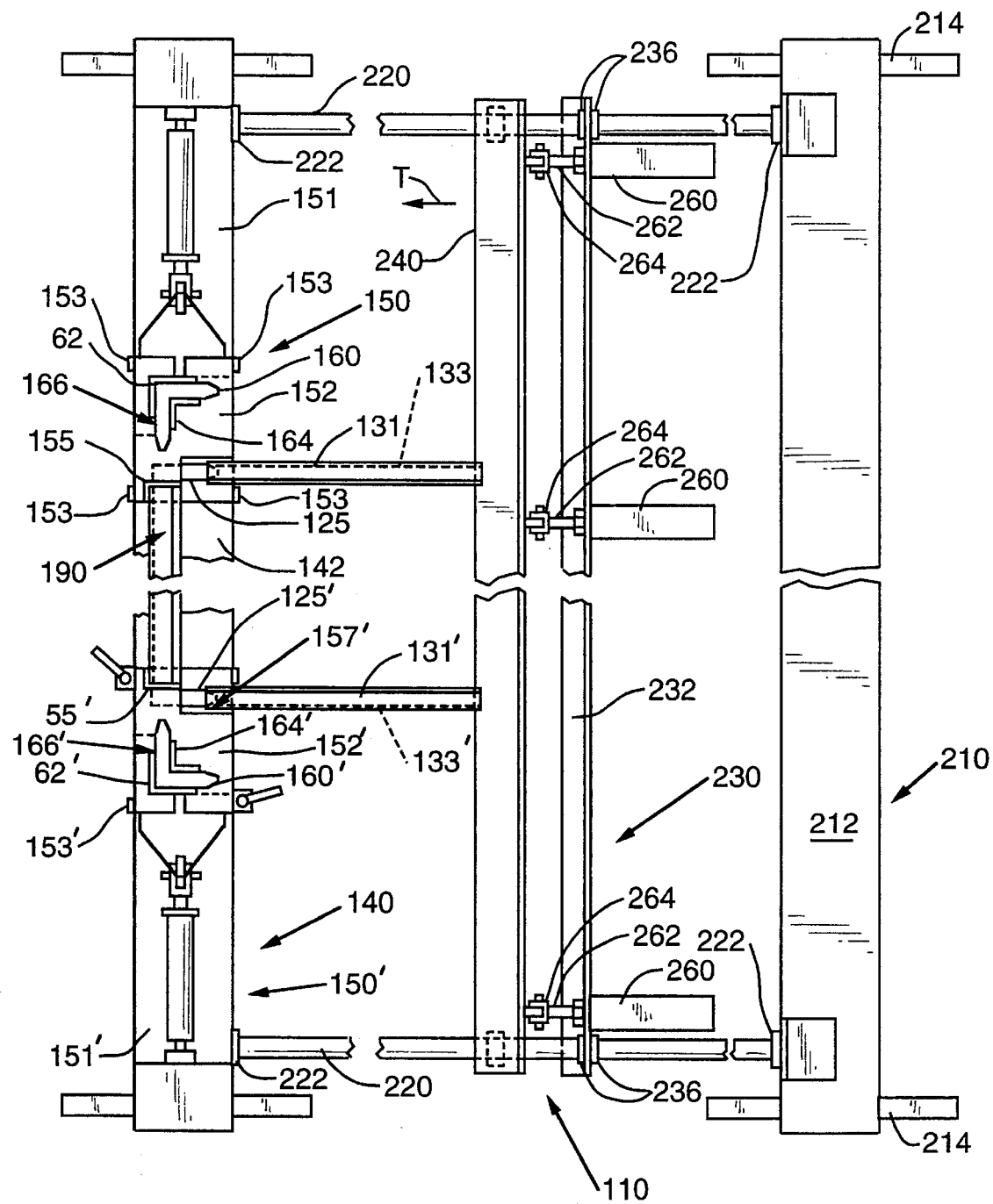
FIG. 14 is a plan view of the duct frame assembly apparatus of FIGS. 12 and 13 after first and second corner members have been inserted into the corresponding channel of a first flange member to form a first flange assembly.
Figure 15:
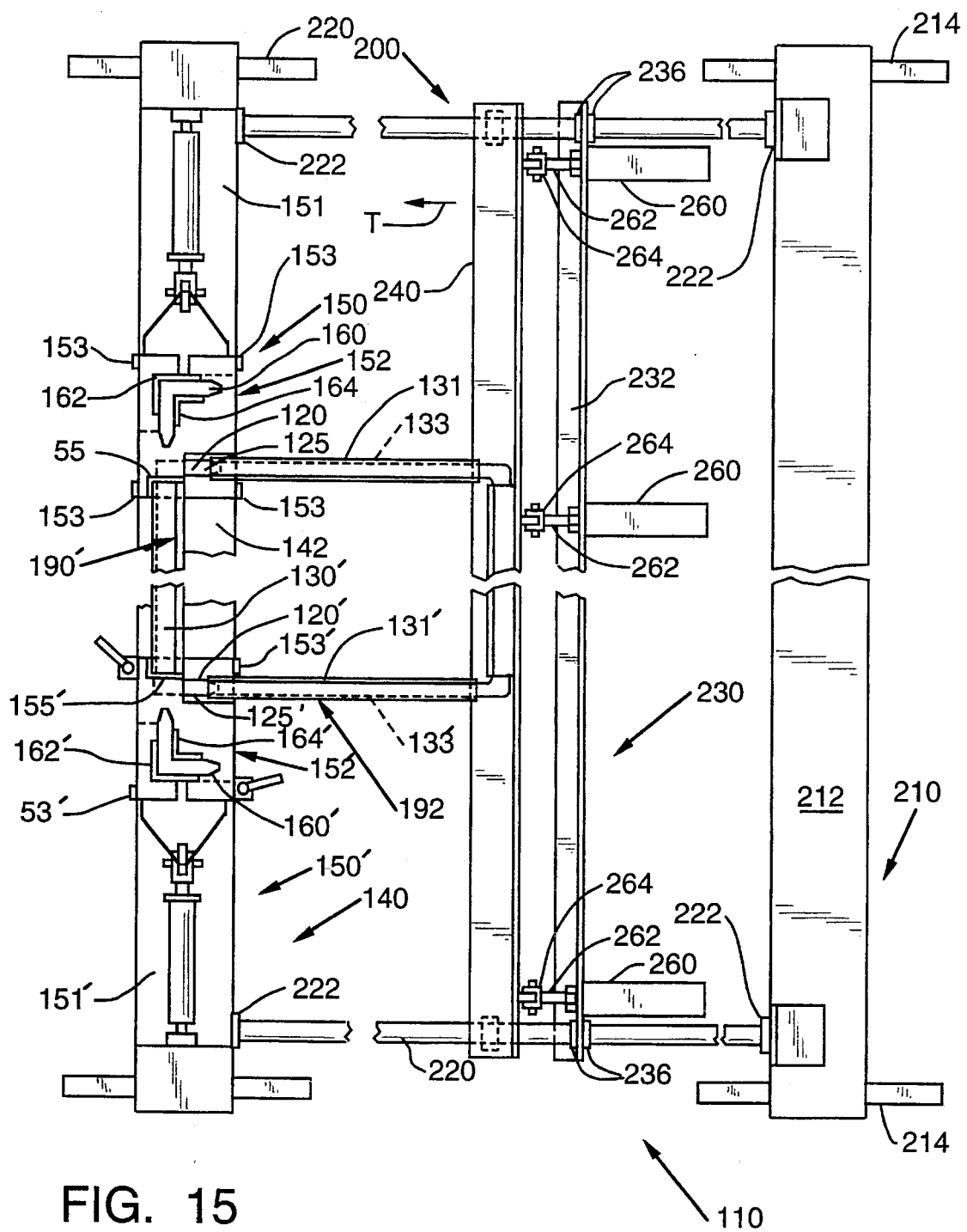
FIG. 15 is another plan view of the duct frame assembly apparatus of FIGS. 12–14 depicting a second duct flange assembly prior to being connected to a three-sided flange assembly.

The resulting flange/corner piece assembly, generally designated as 190, is depicted in FIG. 14. After the above-described assembly process is completed, a "second" lateral flange member 131 is positioned in a "second" insertion position wherein one end thereof is received on the base member 142 within the notch 157 in the positioning member 152 and the recess 159 in the mounting plate 151. Similarly, a "third" lateral flange member 131' is positioned in a "third" insertion position wherein one end thereof is received on the base member 142 within the notch 157' in the positioning member 152' and the recess 159' in the mounting plate 151'. The split collars 236 are then unlocked to permit the third insertion assembly 230 to be slidably positioned on the rails 220. The third insertion assembly 230 is positioned such that the other ends of the second flange member 131 and the third flange member 131' are supported on the support member 240. Thereafter, the third insertion assembly 230 is locked in that position by locking the split collars 236. The skilled artisan will appreciate that this "presetting" of the third insertion assembly 230 can also be conducted prior to making the first flange assembly 190.

After the third insertion assembly 230 has be preset and the second and third lateral flange members (131, 131') have been positioned in the second and secondary insertion positions, respectively, cylinders 260 are actuated to move the support member 240 in the "T" direction. Such movement of the support member 240 in the "T" direction causes the second leg 125 of the first corner 120 to be inserted into the channel 133 of the second flange member 131 and the secondary leg 125' of the primary corner member 120' to be inserted into the channel 133' of the secondary flange member 131'. The skilled artisan will appreciate that the strokes of cylinders 260 are preferably equally adjusted such that the legs (125, 125') are simultaneously inserted into their corresponding channels (133, 133') a predetermined distance "A" to form a three sided frame assembly generally designated as 192. The three sided frame assembly 192 is then repositioned on the third insertion assembly 230 in the manner shown in FIG. 15.

A fourth flange member 130' is thereafter placed on the base member 142 in a receiving position as was described above and two additional corner members 120 and 120' are inserted therein in the manner discussed above to form a flange assembly 190'. Thereafter, the free ends of the second and third flange members (131, 131') are positioned in the second and secondary insertion positions in the manner described above and the cylinders 260 are again actuated to force the flange members (131, 131') toward their corresponding corner members (120, 120') of the frame assembly 190' such that the legs thereof are inserted therein to form the duct frame assembly 10. The duct frame assembly 10 can thereafter be removed from the duct frame assembly apparatus 110 and attached to the end of a corresponding section of duct.

Figure 16:
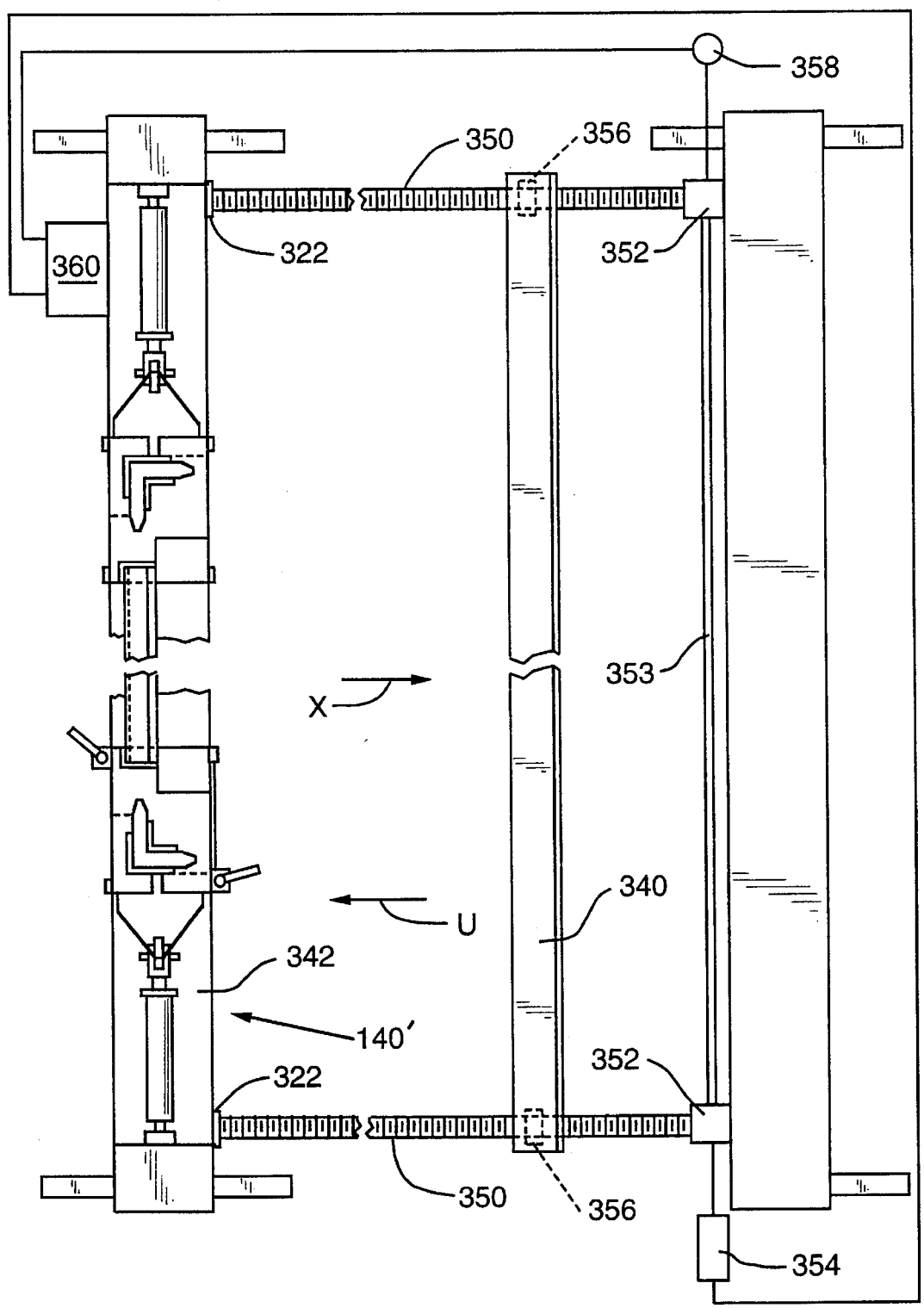
FIG. 16 is a plan view of another embodiment of the duct frame assembly apparatus of the present invention.

In yet another preferred embodiment, as shown in FIG. 16, the duct flange assembly 140' is identical in construction and operation to the duct flange assembly 140 discussed above. In this embodiment, however, the support member 340 is movably supported on linear screws 350. Preferably, linear screws 350 are each attached to a corresponding gear box 352. A motor 354 is coupled to one of the gear boxes 352 and the gear boxes 352 are coupled together by a coupling rod 353 to transmit the rotary motion supplied by the motor 354 to both linear screws 350. The skilled artisan will appreciate that the gear boxes 352 are sized such that both linear screws 350 rotate at the same speed. It will be further appreciated, however, that each linear screw 350 could be powered by a separate motor. The other end of each screw member 350 is rotatably attached to the base member 342 by a commercially available bearing member 322. The support member 340 is attached to the screw members 350 by commercially available nut members 356 that are attached to the bottom of the support member 340. The skilled artisan will appreciate that, as the screw members 350 are rotated by the motor 354, the support member 340 will move linearly in the "U" or "X" directions depending upon the direction of screw rotation. Preferably, a commercially available encoder 358 is coupled to the motor 354 in a known manner to enable the linear position of the support member 340 to be tracked using known control techniques. Commercially available motor control components are housed in a control panel 360 that is preferably attached to the base 342. It will be appreciated that this embodiment of the present invention otherwise operates in the same manner as the duct flange assembly apparatus 110 described above. It will be further appreciated that, although the screw members 352 are depicted as threaded members in FIG. 16, other apparatuses such as ball screw/ball nut assemblies may also be successfully used.

Figure 17:
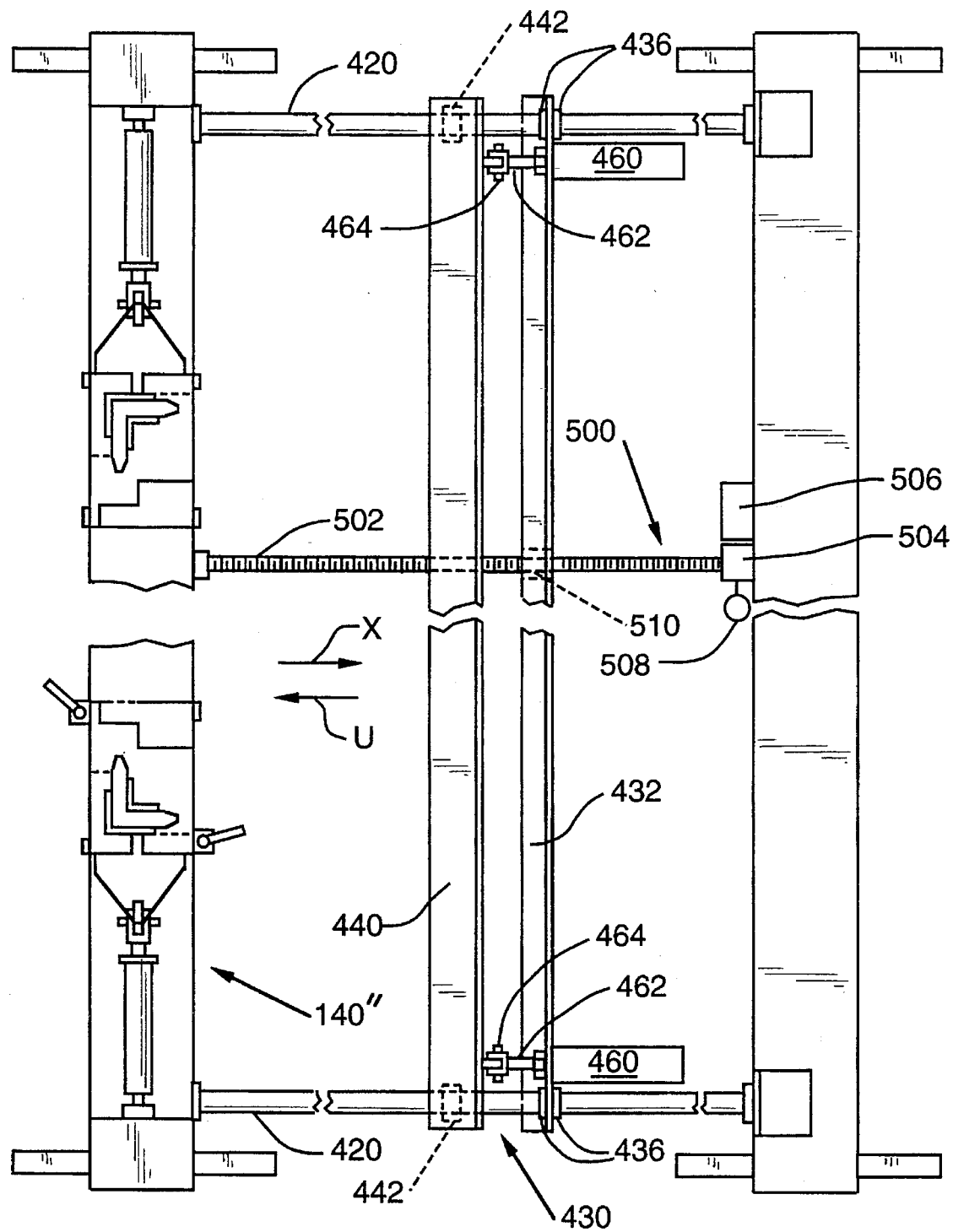
FIG. 17 is a plan view of yet another embodiment of the duct frame assembly apparatus of the present invention.

Another preferred embodiment is depicted in FIG. 17. The frame assembly apparatus of this embodiment includes a duct flange assembly 140" that is identical in construction and operation to the duct flange assembly 140 discussed above. This embodiment also includes a third insertion assembly 430 that is movably mounted to rails 420. Insertion assembly 430 preferably comprises a cross member 432 and a support member 440. Cross member 432 is preferably fabricated from angle iron; however, other material may also be used. In this embodiment, the cross member 432 is movably supported on rail members 420 by commercially available linear bearings 436 that are attached thereto. In this embodiment, the linear position of the cross member 432 is adjusted by a linear screw assembly 500. As can be seen in FIG. 17, linear screw assembly 500 comprises at least one linear screw member 502 that has one end thereof rotatably attached to the base member of the duct flange assembly 140" and the other end thereof attached to a gear box 504 that is operably coupled to a motor 506. Preferably, a commercially available encoder 508 is operably coupled in a known manner to the motor 506 to enable the rotation of the screw member 502 and, ultimately, the position of the insertion assembly 430 to be controlled using known control techniques. Cross member 432 is attached to the screw member 502 by a commercially available nut member 510 that is attached to the bottom of the cross member 432. The skilled artisan will appreciate that, as the screw member is rotated by the motor 506, the cross member 432 will move linearly in the "U" or "X" directions depending upon the direction of screw rotation.

In this embodiment, the support member 440 is also preferably fabricated from angle iron. Commercially available bearing members 442 are attached to the bottom of the support member 440 for movably supporting the support member 440 on the rails 220. At least one, and preferably two, cylinders 460, each having extendable pistons 462, are attached to the cross-member 432 as shown in FIG. 17. Cylinders 460 are preferably arranged as shown such that the free ends of their pistons 462 are attached to the support member 440 by clevis assemblies 464. This preferred embodiment of the present invention operates in the same manner as the duct frame assembly apparatus 110 discussed above except that the location of the insertion assembly 430 can be selectively positioned and retained in that position by the screw assembly 500.

Accordingly, the present invention provides a safer and more efficient manner for assembling duct flange assemblies and complete frame assemblies used to connect the adjacent ends of sheet metal ducts. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for inserting the legs of an L-shaped corner member into corresponding channels of elongated flange members used in an assembly for connecting the adjacent ends of sheet metal ducts, comprising:

a base member for supporting a first flange member in a first receiving position;

first positioning means attached to said base member for positioning said L-shaped corner member in a first insertion position wherein a first leg of said L-shaped corner member is in confronting relationship with the channel on a first end of said first flange member;

first insertion means attached to said base member for inserting said first leg of said L-shaped corner member into the channel of said first flange member adjacent said first end thereof;

second positioning means attached to said base member for positioning a first end of a channel in a second flange member in confronting relationship with a second leg of said L-shaped corner member; and second insertion means attached to said base for inserting said second leg of said L-shaped corner member into the channel of said second flange member adjacent said first end thereof.

2. The apparatus of claim 1 further comprising storage means attached to said base member for storing a plurality of said L-shaped corner members such that after the first leg of an L-shaped corner member is inserted into the channel of a first flange member, another L-shaped corner member is moved to said first insertion position.

3. The apparatus of claim 1 wherein said first positioning means further comprises a first recessed area in said base member for positioning said first end of said first flange member relative to said first leg of said L-shaped corner member to enable said first leg to be inserted into said channel of said first flange member.

4. The apparatus of claim 1 wherein said second positioning means further comprises a second recessed area in said base member for positioning said first end of said second flange member relative to said second leg of said L-shaped corner member to enable said second leg to be inserted into said channel of said second flange member.

5. The apparatus of claim 1 wherein said first insertion means comprises a first cylinder having a selectively extendable and retractable piston adapted to selectively engage said L-shaped corner member to cause said first leg thereof to be inserted into said channel of said first flange member a first predetermined distance.

6. The apparatus of claim 1 wherein said second insertion means comprises at least one second cylinder each having a selectively extendable and retractable piston adapted to selectively urge said second flange member toward said L-shaped corner member such that said second leg thereof is inserted into said channel of second flange member a second predetermined distance.

7. The apparatus of claim 6 further comprising:

a flange support member attached to said selectively extendable and retractable pistons of said second cylinders, said flange support member supporting a second end of said second flange member when said first end of said channel in said second flange member is in said confronting relationship; and at least one motorized screw member operably attached to said base member and said second cylinders for selectively positioning said second cylinders relative to said second positioning means to enable said second end of said second flange member to be received on said flange support means.

8. The apparatus of claim 1 wherein said second insertion means comprises:

a motorized screw operably attached to said base member; and an engagement member attached to said motorized screw and constructed to be selectively linearly moved thereby to force said second flange member toward said L-shaped corner member such that said second leg thereof is inserted into said channel of second flange member a second predetermined distance.

9. Apparatus for assembling L-shaped corner members and elongated flange members into a frame assembly for connecting the adjacent ends of rectangular sheet metal ducts, comprising:

a base member for supporting a first flange member in a first assembly position;

first positioning means attached to said base member for positioning a first leg of a first L-shaped corner member in a first insertion position wherein said first leg thereof is in confronting relationship with one end of a channel extending through said first flange member;

second positioning means attached to said base member for positioning a primary leg of a primary L-shaped corner member in a second insertion position wherein said primary leg thereof is in confronting relationship with the other end of said channel extending through said first flange member;

first insertion means attached to said base member for inserting said first leg of said first L-shaped corner member into said end of said channel extending through said first flange member a first predetermined distance;

second insertion means attached to said base member for inserting said primary leg of said primary L-shaped corner member into said other end of said channel extending through said first flange member a primary predetermined distance;

third positioning means attached to said base member for positioning an end of a second flange member in a primary insertion position on said base member such that a channel extending through said second flange member is in confronting relationship with a second leg of said first L-shaped corner member;

fourth positioning means attached to said base member for positioning an end of a third flange member in a secondary insertion position on said base member such that a channel extending through said third flange member is in confronting relationship with a secondary leg of said primary L-shaped corner member; and third insertion means attached to said base member for inserting said second leg of said first L-shaped corner member into said channel of said second flange member a second predetermined distance and inserting said secondary leg of said primary L-shaped corner member into said channel of said third flange member a secondary predetermined distance.

10. The apparatus of claim 9 wherein said first positioning means further comprises first means for storing a plurality of said first L-shaped corner members therein such that after the first leg of a first L-shaped corner member is inserted into said channel extending through said first flange member, another said first L-shaped corner member is moved to said first insertion position and wherein said second positioning means further comprises second means for storing a plurality of primary L-shaped corner members therein such that after said primary leg of a primary L-shaped corner member is inserted into the other end of said channel extending through said first flange member, another said primary L-shaped corner member is moved to said primary insertion position.

11. The apparatus of claim 9 wherein said first insertion means comprises a first cylinder having a selectively extendable and retractable piston adapted to selectively engage said first L-shaped corner member to cause said first leg thereof to be inserted into said channel of said first flange member said first predetermined distance and wherein said second insertion means comprises a second cylinder having a selectively extendable and retractable piston adapted to selectively engage said primary L-shaped corner member to cause said primary leg thereof to be inserted into said channel of said first flange member said primary predetermined distance and wherein said third insertion means comprises support means movably supported relative to said base member and adapted to engage and support the other ends of said second and third flange members when said second and third flange members are in said primary and secondary insertion positions, respectively, and forcing means attached to said support means for selectively causing said support means to move said second and third flange members toward said first and primary L-shaped corner members, respectively, such that said second leg of said first L-shaped corner member is inserted into said channel extending through said second flange member and said secondary leg of said primary L-shaped corner member is inserted into said channel extending through said third flange member.

12. The apparatus of claim 11 wherein said forcing means comprises at least one third cylinder having a selectively extendable and retractable piston attached to said support means.

13. The apparatus of claim 11 wherein said forcing means comprises at least one motorized screw assembly operably attached to said support means such that the rotation of said screw assembly causes said support means to move said second and third flange members toward said first and primary L-shaped corner members, respectively.

14. The apparatus of claim 9 wherein said first positioning means further comprises a first recessed area in said base member for positioning one end of said first channel member relative to said first leg of said first L-shaped corner member to enable said first leg to be inserted into said channel thereof and wherein said second positioning means further comprises a second recessed area in said base member for positioning the other end of said first flange member relative to said primary leg of said primary L-shaped corner member to enable said primary leg to be inserted into said channel thereof and wherein said third positioning means further comprises a third recessed area in said base member for positioning one end of said second flange member relative to said second leg of said first L-shaped corner member to enable said second leg to be inserted into said channel of said second flange member and wherein said fourth positioning means further comprises a fourth recessed area in said base member for positioning one end of said fourth flange member relative to said secondary leg of said primary L-shaped corner member to enable said secondary leg to be inserted into said channel thereof.

15. Apparatus for inserting a first leg of a first L-shaped corner member which has a first insertion axis into a first channel of a first flange member which has a primary insertion axis and a second leg of a second L-shaped corner member which has a second insertion axis into a second channel of a second flange member which has a secondary insertion axis, the apparatus comprising:

a frame assembly;

means attached to said frame assembly for positioning and retaining said first and second L-shaped corner members in first and second insertion positions, respectively;

channel support means attached to said frame assembly, said channel support means supporting said first and second flange members such that said first axis of said first L-shaped corner member is substantially coaxially aligned with said first axis of said primary channel and said second axis of said second L-shaped corner member is substantially coaxially aligned with said secondary axis of said second channel; and means attached to said frame assembly for inserting said first leg of said first L-shaped corner member into said first channel of said first flange member and said second leg of said second L-shaped corner member into said second channel of said second flange member.

* * * * *